Patented Aug. 8, 1950

2,517,835

UNITED STATES PATENT OFFICE 2,517,835

PROCESS FOR PRODUCTION OF LOW VISCOSITY CARBOXYALKYL CELLULOSE

Wiley M. Branan, Penns Grove, and Harrison H. Holmes, Woodbury, N. J., assignors to E. I. du Pont de Nemours & Company, Wilmington, Del., a corporation of Delaware No Drawing. Application November 21, 1947, Serial No. 787,486

8 Claims. (Cl. 260—231)

This invention relates to an improved process for the manufacture of ethers of cellulose and more particularly to such a process whereby a water-soluble sodium carboxy-methylcellulose product of special properties is obtained.

The methods previously employed for the preparation of sodium carboxymethylcellulose have comprised the preparation of alkali cellulose by the reaction of cellulosic material with caustic alkali, and etherification of the alkali cellulose by means of monochloroacetic acid or its sodium salt. An outstanding property of sodium carboxymethylcellulose so prepared is the high viscosity of its aqueous solutions; an aqueous solution, for example, containing 1% of the product has a viscosity of from 20 to more than 1000 centipoises, depending on the viscosity of the cellulose employed and on conditions of etherification such as ingredient ratios, reaction time, and temperature. Material of this type is suitable for certain industrial applications, for example as a binder, protective colloid, thickening agent and the like.

On the other hand, the sodium carboxymethylcellulose of the prior art, because of its high viscosity, is not adapted for applications which require a high concentration of the cellulose ether in aqueous solution. In textile warp sizing baths, which must contain around 5% solids, its solutions are so viscous that they cannot be applied by practical means. It is also unsuitable for most adhesive compositions, because it can be dispersed in water only to the extent of about 10% by weight of solution as compared with a desired 20% or more.

An object of the present invention is an improved method for the manufacture of ethers of cellulose. A further object is an improved process for the production of water-soluble sodium carboxymethylcellulose whereby a product is obtained of greatly decreased viscosity in aqueous solution. A still further object is such a process whereby the decreased viscosity results from the use of a catalytic agent in the process. Additional objects will be disclosed as the invention is described at greater length hereinafter.

We have found that the foregoing objects are accomplished, and an improved product obtained, when we treat cellulosic material with excess caustic alkali solution and an etherifying agent, the latter agent being monochloroacetic acid in the preferred embodiment. It is a requirement of our invention that, following etherification, there be present in the reaction mixture a small amount of a compound of manganese or other metal having an atomic number between 23 and 29, that is of the group consisting of vanadium, chromium, manganese, iron, cobalt, nickel, and copper. The use of such metal may be accompanied by other known treatments, for example aging at normal or elevated temperature during and subsequent to the etherification, followed by neutralization of the excess alkali, washing, and drying.

The method of carrying out the invention and the beneficial results obtained will be seen more clearly by reference to the following specific examples, which are given by way of illustration only and are not to be taken as limiting in any way. In these examples, the cellulose ingredient is a woodpulp from western coniferous trees, purified by sulfite digestion and bleaching, and having a cuprammonium viscosity of about 75 seconds by the American Chemical Society Method at 2½ grams pulp per 100 ml. of solution.

Example 1

This example is not cited as an embodiment of our invention but is offered for comparison with the remaining examples which demonstrate our invention.

A solution of 450 grams of sodium hydroxide in 450 grams of water was prepared and this was mixed with 1600 grams of ethyl alcohol. Woodpulp in the amount of 750 grams was introduced into the above solution mixture and blended in a Werner-Pfleiderer mixer over a period of 1 hour. Monochloroacetic acid in the amount of 360 grams was then added and the mixture agitated for an additional hour. The mixture was then allowed to age undisturbed at room temperature for a period of 16 hours, during which time etherification to sodium carboxymethylcellulose was proceeding. The material was then aged at 60° C. and samples were taken for viscosity determinations at various time intervals. Each sample was finished by neutralizing with acetic acid, washing with aqueous ethyl alcohol and drying.

| Time at 60° C. | Viscosity of 5% Sol'n (cp. at 25° C.) |
|---|---|
| 24 hours | Thick gel. |
| 48 hours | Do. |
| 72 hours | 761. |

Sodium carboxymethylcellulose prepared according to this example represents the prior art; a viscosity of 761 cp. in 5% solution corresponds to about 15 cp. in 1% solution.

*Example 2*

Sodium carboxymethylcellulose was prepared according to the procedure of Example 1, except that, following the aging period of 16 hrs. at room temperature, the crude reaction mixture was returned to the W-P mixer and 0.50 gram of manganous sulfate ($MnSO_4 \cdot H_2O$) was introduced and mixed 30 minutes. The proportion of manganous sulfate corresponded to 1 part by weight of elemental manganese for each 5000 parts of cellulose.

The material was then aged at 60° C. and samples were taken for viscosity determinations at various intervals. The following viscosity values in 5% aqueous solution of the purified sodium carboxymethylcellulose were determined:

| Time at 60° C. | Viscosity of 5% Sol'n (cp. at 25° C.) |
|---|---|
| 24 hours | 293 |
| 48 hours | 27 |
| 72 hours | 14 |

It will be seen, therefore, that the presence of manganese as catalyst had a remarkable effect in allowing the preparation of a low viscosity grade of material in a greatly shortened time period. The viscosity at the end of 72 hours, with no manganese present, had been reduced only to 761 cp.; while with a manganese-cellulose ratio of 1 to 5000 the viscosity was lower than 761 cp. after only 24 hours, and was lowered to 14 cp. after 72 hours. The product of 14 cp. viscosity in 5% solution had a viscosity of less than 2 cp. in 1% solution.

*Example 3*

Whereas in Example 2 the catalyst was added to the mixture after the formation of the sodium carboxymethylcellulose, for convenience of operation it is desirable to add the catalyst with the initial ingredients and thus eliminate a second mixing period after the formation of the sodium carboxymethylcellulose.

Sodium carboxymethylcellulose was prepared according to the procedure of Example 1, except that 1 gram of manganous sulfate ($MnSO_4 \cdot H_2O$) was introduced into the reaction mixture by suspension in the initial sodium hydroxide solution; hence 1 part by weight of elemental manganese was present for each 3000 parts of cellulose. After the same aging procedure as in Example 1, viscosity determinations were made with the following results:

| Time at 60° C. | Viscosity of 5% Sol'n (cp. at 25° C.) |
|---|---|
| 24 hours | 209 |
| 48 hours | 19 |
| 72 hours | 7 |

Further trials, using the same operating procedure but with lower manganese ratios, showed the manganese to be effective in the smaller amounts, though with lessened effect, as illustrated below, the viscosities again being determined in 5% aqueous solutions.

| Mn-Cellulose Ratio | Time | Viscosity (cp.) |
|---|---|---|
| 1/6,000 | Hours 24 | Thick gel. |
| | 48 | 177. |
| | 72 | 33. |
| 1/30,000 | 24 | Thick gel. |
| | 48 | 310. |
| | 72 | 66. |

*Example 4*

The procedure of Example 1 was followed in the preparation of sodium carboxymethylcellulose, the same amounts of reactants being used, except that the product was aged at 25° C. rather than at 60° C. Using otherwise similar processes, except that in one case manganese was present and in the other case absent, viscosity determinations showed the following values:

| Catalyst | Ratio, Mn-Cellulose | Time at 25° C. | Viscosity (cp.) | |
|---|---|---|---|---|
| | | | 2+ Sol'n | 5+ Sol'n |
| None | | Days 2 | 377 | Thick gel. |
| | | 19 | 94 | Do. |
| Mn | 1/3,000 | 2 | 161 | Do. |
| | | 19 | 6 | 104. |

*Example 5*

Three batches of sodium carboxymethylcellulose were prepared as in Example 3, except that in place of manganese the following metals were employed as catalysts, respectively; nickel added as nickelous oxalate; cobalt added as cobaltous nitrate; and vanadium added as ammonium metavanadate. In all cases 1 part by weight of elemental metal was present for each 6000 parts of cellulose. Samples were taken for viscosity determinations, and the following results were obtained after the indicated times of aging at 60° C.

| Catalyst | Ratio | Compound Added | Time | Viscosity, cp. 5% Sol'n |
|---|---|---|---|---|
| Ni | 1/6000 | Nickelous Oxalate | Hours 24 | Thick gel. |
| | | | 48 | 589. |
| | | | 72 | 152. |
| Co | 1/6000 | Cobaltous Nitrate | 24 | 48. |
| | | | 48 | 14. |
| | | | 72 | 14. |
| V | 1/6000 | Ammonium Metavanadate | 24 | 120. |
| | | | 48 | 43. |
| | | | 72 | 21. |

In further experiments we have found that iron also accelerates the viscosity reduction, but considerably higher proportions of it, e. g. 1 part to 250 of cellulose, are required; we prefer, therefore, to use the other metals described.

The invention comprises in its preferred scope an improvement in the method of manufacturing sodium carboxymethylcellulose, whereby a product of unusually low viscosity may be obtained, and one that meets many industrial requirements. It will be understood that many of the advantages of this cellulose ether are dependent on its viscosity characteristics and different uses call for varying degrees of viscosity.

According to the present invention, a product of remarkably low viscosity is obtained by maintaining in the reaction mixture following the etherification step a small amount of a catalyst comprising a compound of a metal having an atomic number between 23 and 29, this group consisting of vanadium, chromium, manganese, iron, cobalt, nickel and copper. Various compounds are available for use such as the sulfates or nitrates or chlorides of the above metals and others. Of the manganese compounds, we may select the sulfate, chloride, phosphate and other such salts, or such compounds as potassium permanganate and manganese dioxide.

In utilizing manganese compounds, we find it generally desirable to maintain a concentration of between 1 to 1000 and 1 to 30,000 parts by weight of manganese and cellulose, respectively, the manganese being calculated as the amount of the element. A preferred ratio is 1 to 3000 and a desirable aging period is 4 hours at 60° C. Using such conditions, a purified sodium carboxymethylcellulose will be obtained showing a viscosity of 5 to 20 centipoises in 5% aqueous solution. In the absence of a catalyst, a much longer aging period would be required to give a product of comparable viscosity.

The examples have been drawn to the production of sodium carboxymethylcellulose, as this is an important compound of the general class covered and one where the advantages obtained are particularly desirable. The invention is applicable, however, to ethers of cellulose generally, for example, to the preparation of such materials as potassium carboxymethylcellulose, ethyl cellulose, methyl cellulose, mixed methyl-ethyl cellulose, hydroxyethyl cellulose, benzyl cellulose, and the like. While carboxyalkyl celluloses are conveniently made by the use of monochloroacetic acid, other halogen-substituted fatty acids may equally well be used, for example bromacetic acid, chloropropionic acid, etc.

We have described our invention adequately in the foregoing, but it will be understood that many variations in details of procedure, reaction conditions, ingredient proportions and the like may be introduced without departure from the scope of the invention. Thus, the method of preparation of sodium carboxymethylcellulose as given in the foregoing examples includes the formation of alkali cellulose by the action of caustic alkali on purified woodpulp, but cotton or other cellulosic materials are equally satisfactory, and the molecular weight of the cellulose may vary over a wide range with a corresponding variation in the viscosity of the ether. The examples describe the use of alkali cellulose prepared by mixing cellulose and caustic alkali in a W-P mixer; however, the usual process of steeping, pressing, and shredding may be employed for the production of the alkali cellulose. Desirably, ethyl alcohol is present, although it may be omitted or other water miscible organic solvents may be substituted. Whereas chloroacetic acid in the solid form has been used, compounds such as sodium monochloroacetate or methyl or ethyl monochloroacetate may be used equally well.

We intend to be limited, therefore, only by the following claims:

1. In the production of water-soluble salts of carboxyalkylcellulose ethers of reduced viscosity, the process which comprises adding to the reaction mixture, after treatment of cellulose with caustic alkali and an etherifying agent selected from the group consisting of halogen substituted fatty acids and alkali salts of halogen substituted fatty acids, a compound of a metal selected from the group consisting of manganese, cobalt, nickel and vanadium in the ratio of one part of elemental metal to between 1,000 and 30,000 parts of cellulose by weight.

2. A process as claimed in claim 1, wherein the compound of a metal is a compound of manganese.

3. A process as claimed in claim 1, wherein the compound of a metal is a compound of cobalt.

4. A process as claimed in claim 1, wherein the compound of a metal is a compound of nickel.

5. A process as claimed in claim 1, wherein the compound of a metal is a compound of vanadium.

6. In the production of water-soluble salts of carboxymethylcellulose of reduced viscosity, the process which comprises adding to the reaction mixture, after treatment of cellulose with caustic alkali and an etherifying agent selected from the group consisting of monochloroacetic acid and alkali salts of monochloroacetic acid, a compound of a metal selected from the group consisting of manganese, cobalt, nickel and vanadium in the ratio of one part of elemental metal to between 1,000 and 30,000 parts of cellulose by weight.

7. A process as claimed in claim 6, wherein monochloroacetic acid is used as the etherifying agent.

8. A process as claimed in claim 6, wherein sodium chloroacetate is used as the etherifying agent.

WILEY M. BRANAN.
HARRISON H. HOLMES.

REFERENCES CITED

The following references are of record in the file of this patent:

UNITED STATES PATENTS

| Number | Name | Date |
|---|---|---|
| 1,489,315 | Donohue | Apr. 8, 1924 |
| 2,141,721 | Meinel | Dec. 27, 1938 |
| 2,190,445 | Ellsworth | Feb. 13, 1940 |
| 2,278,612 | Collings et al. | Apr. 7, 1942 |